United States Patent
Choi et al.

(10) Patent No.: US 9,442,313 B2
(45) Date of Patent: Sep. 13, 2016

(54) THERMOCHROMIC WINDOW AND METHOD OF FABRICATING THE SAME

(71) Applicant: SAMSUNG CORNING PRECISION MATERIALS CO., LTD., Gumi-si, Gyeongsangbuk-do (KR)

(72) Inventors: Yongwon Choi, Asan-si (KR); Yung-Jin Jung, Asan-si (KR); Chang Gyu Kim, Asan-si (KR); Hyun Bin Kim, Asan-si (KR)

(73) Assignee: SAMSUNG CORNING PRECISION MATERIALS CO., LTD., Asan-si, Chungcheongnam-do (KR)

( * ) Notice: Subject to any disclaimer, the term of this patent is extended or adjusted under 35 U.S.C. 154(b) by 0 days.

(21) Appl. No.: 14/276,860

(22) Filed: May 13, 2014

(65) Prior Publication Data

US 2014/0333984 A1    Nov. 13, 2014

(30) Foreign Application Priority Data

May 13, 2013    (KR) .................. 10-2013-0053533

(51) Int. Cl.
*G02F 1/153*    (2006.01)
*G02F 1/01*    (2006.01)
(Continued)

(52) U.S. Cl.
CPC ......... *G02F 1/0147* (2013.01); *C03C 17/3605* (2013.01); *C03C 17/3644* (2013.01); *C03C 17/3649* (2013.01); *C03C 17/3657* (2013.01);
(Continued)

(58) Field of Classification Search
USPC ....... 359/237, 288–292, 296, 298, 273, 275, 359/277, 265; 427/160, 161, 162, 163.1; 428/34, 36.91, 36.6, 35.4, 34.6; 423/594.17, 594.18
See application file for complete search history.

(56) References Cited

U.S. PATENT DOCUMENTS

2002/0102394 A1    8/2002    Macquart et al.
2003/0196454 A1    10/2003    Jin
(Continued)

FOREIGN PATENT DOCUMENTS

CN    101205120 A    6/2008
CN    101817644 A    9/2010

OTHER PUBLICATIONS

"Temperature-agile and structure-tunable optical properties of VO/Ag thin films," Author:Zhang X R; Wang W; Zhao Y; Hu X; Reinhardt K; Knize R J; Yalin Lu, Publication data: Applied Physics A; Materials Science & Processing, Oct. 31, 2012 Springer, Berlin, DE—ISSN 1432-0630 DOI:http://dx.doi.org/10.1007/s00339-012-7351-2 Source information:vol. 109, Nr:4, pp. 845-849.

(Continued)

*Primary Examiner* — Joseph P Martinez
*Assistant Examiner* — Brandi Thomas
(74) *Attorney, Agent, or Firm* — McDermott Will & Emery LLP

(57) ABSTRACT

A thermochromic window, the sunlight transmittance of which is adjustable depending on temperature, and a method of fabricating the same. The thermochromic window includes a substrate, a plurality of nanodots formed on the substrate, and a thermochromic thin film coating the substrate and the nanodots. The thermochromic thin film is made of a thermochromic material. The thickness of the thermochromic thin film disposed on the substrate is smaller than the thickness of the thermochromic thin film disposed on the nanodots.

6 Claims, 4 Drawing Sheets

(51) Int. Cl.
  *C03C 17/36* (2006.01)
  *G02F 1/00* (2006.01)
  *B82Y 20/00* (2011.01)

(52) U.S. Cl.
  CPC ............... *G02F 1/009* (2013.01); *B82Y 20/00* (2013.01); *G02F 2202/36* (2013.01); *Y10S 977/774* (2013.01)

(56) References Cited

U.S. PATENT DOCUMENTS

| | | | | |
|---|---|---|---|---|
| 2003/0215622 | A1 | 11/2003 | MacQuart et al. | |
| 2004/0241457 | A1 | 12/2004 | Macquart et al. | |
| 2010/0309539 | A1 | 12/2010 | Kaye et al. | |
| 2011/0205542 | A1* | 8/2011 | Pendell Jones et al. | 356/445 |
| 2012/0263930 | A1* | 10/2012 | Moon et al. | 428/212 |
| 2014/0146382 | A1* | 5/2014 | Cerny | 359/288 |

OTHER PUBLICATIONS

"Reversible tuning of surface plasmon resonance of silver nanoparticles using a thermochromic matrix," Author:Jin P; Tazawa M; Xu G Publication data:Journal of Applied Physics, May 15, 2006 American Institute of Physics, US—ISSN 0021-8979 Source information:vol. 99, Nr:9, pp. 96106-096106-3.

"Thermochromic nanocrystalline Au@?VO2 composite thin films prepared by radiofrequency inverted cylindrical magnetron sputtering," Author:Kana Kana J B; Ndjaka J M; Ngom B D; Manyala N; Nemraoui O; Fasasi A Y; Nemutudi R; Gibaud A; Knoesen D; Maaza M Publication data:Thin Solid Films, Jan. 1, 2010 Elsevier-Sequoia S.A. Lausanne, CH—ISSN 0040-6090 Source information:vol. 518, Nr:6, pp. 1641-1647.

"Nano-Ag on vanadium dioxide. I. Localized spectrum tailoring," Author:Xu Gang; Huang Chun-Ming; Jin Ping; Tazawa Masato; Chen De-Ming Publication data:Journal of Applied Physics, Sep. 2, 2008 American Institute of Physics, US—ISSN 0021-8979 DOI:http://dx.doi.org/10.1063/1.2973340 Source information:vol. 104, Nr:5, pp. 53101-53101-6.

"Pt/VO2 double-layered films combining thermochromic properties with low emissivity," Author:Kang L; Gao Y; Chen Z; Du J; Zhang Z; Luo H Publication data:Solar Energy Materials and Solar Cells, Dec. 1, 2010 Elsevier Science Publishers, Amsterdam, NL—ISSN 0927-0248 Source information:vol. 94, Nr:12, pp. 2078-2084.

* cited by examiner

THERMOCHROMIC WINDOW AND METHOD OF FABRICATING THE SAME

CROSS REFERENCE TO RELATED APPLICATION

The present application claims priority from Korean Patent Application Number 10-2013-0053533 filed on May 13, 2013, the entire contents of which are incorporated herein for all purposes by this reference.

BACKGROUND OF THE INVENTION

1. Field of the Invention

The present invention relates to a thermochromic window and a method of fabricating the same, and more particularly, to a thermochromic window, the sunlight transmittance of which is adjustable depending on temperature, and a method of fabricating the same.

2. Description of Related Art

In response to increasing prices of chemical energy sources such as petroleum, the necessity for the development of new energy sources is increasing. In addition, the importance of energy saving technologies is increasing with the necessity for these new energy sources. In fact, at least 60% of energy consumption in common houses is attributed to heating and/or cooling. In particular, common houses and buildings lose as much as 24% of their energy through windows.

Accordingly, a variety of attempts have been made to reduce the amount of energy that is lost through windows by increasing the airtightness and insulation characteristics thereof, while maintaining the aesthetics and characteristics of the view which are the basic functions of windows. Typical methods, by way of example, include varying the size of the window and furnishing highly-insulated windows.

Types of highly-insulated window glass include argon (Ar) injected pair-glass in which Ar gas is situated between a pair of glass panes in order to prevent heat exchange, a vacuum window in which the air between a pair of glass panes is evacuated, a low emissivity (low-e) window, and the like. Also being studied is a type of glass that is coated with a layer that has specific thermal characteristics in order to adjust the amount of solar energy that is introduced.

In particular, the surface of the low-e window is coated with a thin layer of metal or metal oxide which allows most visible light that is incident on the window to enter so that the interior of a room can be kept bright, while radiation in the infrared (IR) range can be blocked. The effects of this glass are that it prevents heat from escaping to the outside when heating in winter, and also prevents heat energy from outside a building from entering in summer, thereby reducing cooling and heating bills. However, this window has the following drawbacks due to its characteristic of reflecting wavelengths other than visible light. Specifically, it does not admit the IR range of sunlight into a room, which is a drawback, especially in winter, and the sunlight transmittance thereof is not adjusted according to the season (temperature).

Accordingly, a variety of technologies for thermochromic windows which are provided by coating glass with a thermochromic material is being developed. Such a thermochromic window blocks near infrared (NIR) radiation and infrared (IR) radiation while allowing visible light to pass through when the glass arrives at a predetermined temperature or higher, thereby preventing the room temperature from rising. This can consequently improve cooling/heating energy efficiency.

In particular, a variety of studies are underway on thermochromic windows which are created by coating glass with vanadium dioxide ($VO_2$). The phase transition temperature of $VO_2$ is 68° C., which is close to the temperature at which practical application is possible. In addition, it is easy to control the transmittance of $VO_2$ since its optical constant (n, k) changes significantly.

However, such a thermochromic thin film disadvantageously has a reflective color of dark yellow and a low visible light transmittance caused by a high absorption coefficient for short wavelengths.

Accordingly, in order to increase the visible light transmittance of the thermochromic window, an antireflection layer is formed on the thermochromic window or the thermochromic thin film is patterned by photolithography.

FIG. 1 is a graph showing variations in the transmittance of two thermochromic windows depending on the wavelengths before phase transition (at 20° C.) and after the phase transition (at 90° C.). One thermochromic window has a $VO_2$ thin film coating a glass substrate, and the other thermochromic window has antireflection films formed by respectively disposing $Al_2O_3$ and $TiO_2$ thin films on the upper and lower surfaces of a $VO_2$ thin film formed on a glass substrate.

As shown in FIG. 1, it is apparent that the transmittance of the thermochromic window having the antireflection films is increased in the whole visible light range. While the visible light transmittance is increased, the transmittance in the infrared (IR) range is significantly decreased. The decreased IR transmittance deteriorates the transformation characteristics of the thermochromic window (variations in the IR transmittance before and after phase transition).

In addition, the antireflection film has a multilayer structure including a high refractive index thin film and a low refractive index thin film which are stacked on each other. This type of deposit film is disadvantageous in that its fabrication process is complicated.

Furthermore, the approach of increasing the transmittance of the thermochromic window by patterning the thermochromic thin film is disadvantageous in that its process is complicated and expensive.

The information disclosed in the Background of the Invention section is provided only for better understanding of the background of the invention, and should not be taken as an acknowledgment or any form of suggestion that this information forms a prior art that would already be known to a person skilled in the art.

RELATED ART DOCUMENT

Patent Document 1: Korean Patent Application Publication No. 10-2008-0040439 (May 8, 2008)

BRIEF SUMMARY OF THE INVENTION

Various aspects of the present invention provide a thermochromic window and a method of fabricating the same, in which the visible light transmittance of the thermochromic window can be increased.

In an aspect of the present invention, provided is a thermochromic window that includes: a substrate; a plurality of nanodots formed on the substrate; and a thermochromic thin film coating the substrate and the nanodots, the thermochromic thin film being made of a thermochromic material. The thickness of the thermochromic thin film disposed on the substrate is smaller than the thickness of the thermochromic thin film disposed on the nanodots.

According to an embodiment of the present invention, the nanodots may be made of one selected from the group consisting of Au, Ag, Pd and Pt.

The height of the nanodots may be 9 nm or less.

The composition of the thermochromic thin film may further include a dopant. The dopant may be at least one selected from the group consisting of Mo, W, Nb, Ta, Fe, Al, Ti, Sn and Ni.

The thermochromic material may be vanadium dioxide ($VO_2$).

In another aspect of the present invention, provided is a method of fabricating a thermochromic thin film. The method includes the following steps of: coating a substrate with a catalytic material which is to form nanodots by heat treatment; forming the nanodots on the substrate by heat-treating the catalytic material; and forming a thermochromic thin film by coating the substrate having the nanodots thereon with a thermochromic material.

According to an embodiment of the present invention, the catalytic material may be made of one selected from the group consisting of Au, Ag, Pd and Pt.

The step of forming the nanodots and the step of forming the thermochromic thin film may be concurrently carried out.

The step of coating the substrate with the catalytic material may include applying the catalytic material at a thickness of 5 nm or less.

The composition of the thermochromic thin film may further include a dopant. The dopant may be at least one selected from the group consisting of Mo, W, Nb, Ta, Fe, Al, Ti, Sn and Ni. loom The thermochromic material may be vanadium dioxide($VO_2$).

According to embodiments of the present invention, it is possible to increase the visible light transmittance of the thermochromic window.

In addition, it is possible to increase the transformation efficiency of the thermochromic thin film by increasing the particle size and crystallinity of the thermochromic thin film.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
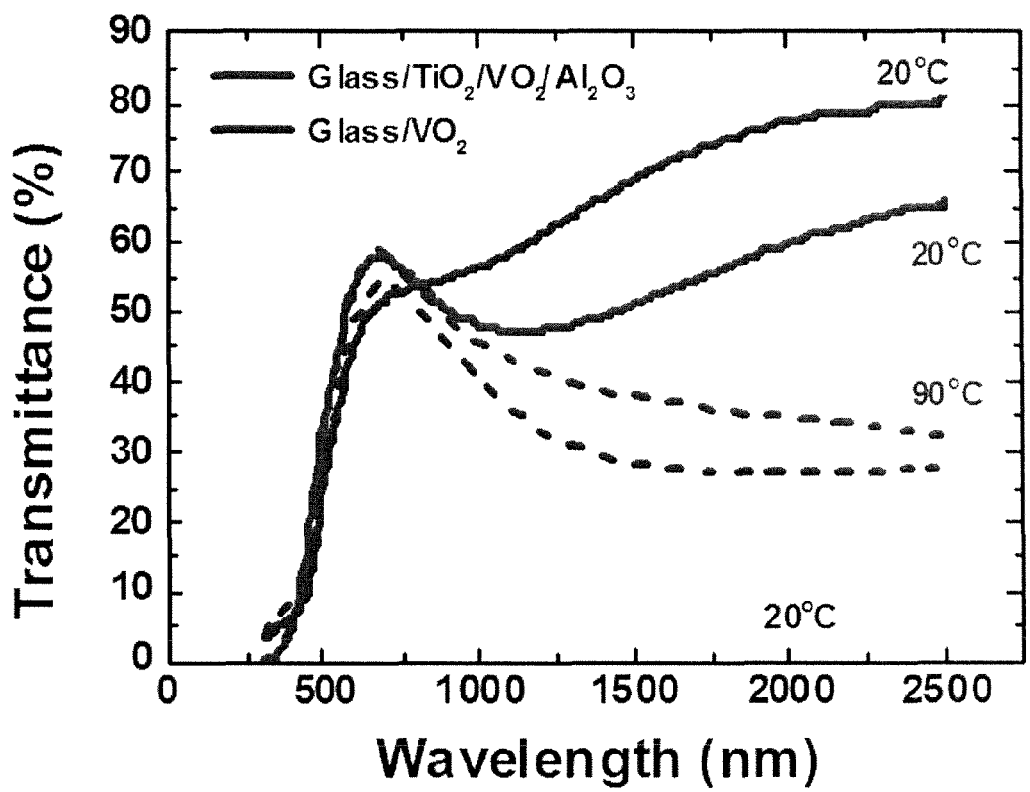
FIG. 1 is a graph showing variations in the sunlight transmittance of a conventional thermochromic window before and after phase transition, the thermochromic window having a $VO_2$ thin film on one surface of a glass substrate.

Reference will now be made in detail to a thermochromic window and a method of fabricating the same according to the present invention, embodiments of which are illustrated in the accompanying drawings and described below, so that a person skilled in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

Figure 2:
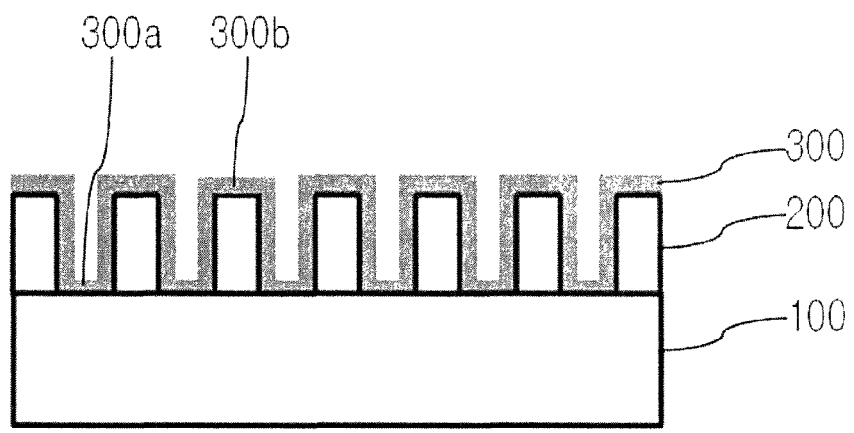
FIG. 2 is a conceptual cross-sectional view showing a thermochromic window according to an exemplary embodiment of the present invention.
Figure 3:
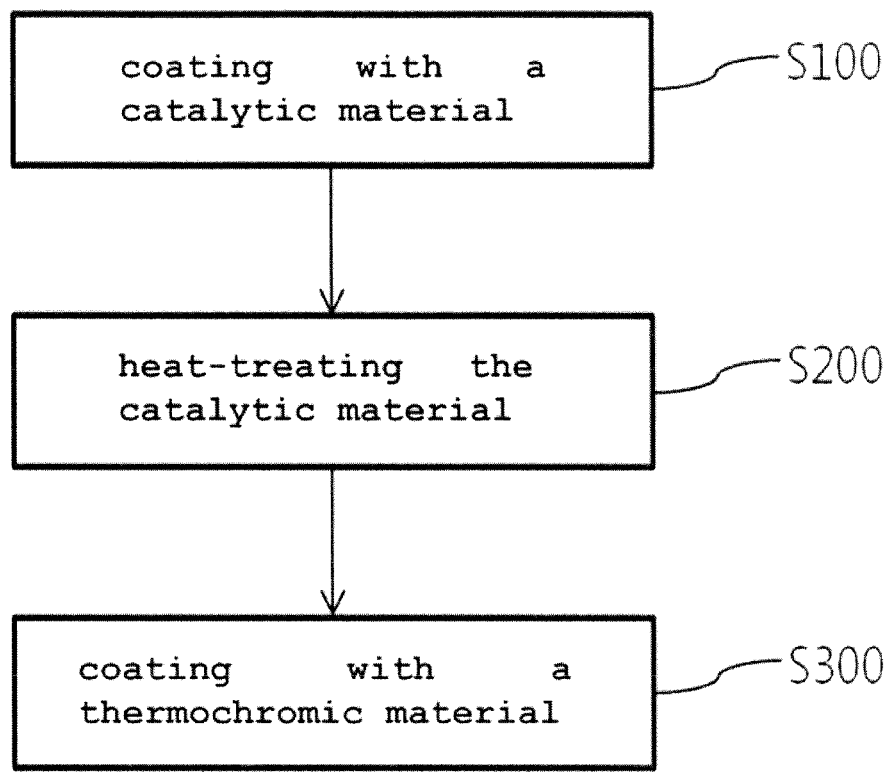
FIG. 3 is a conceptual flowchart showing a method of fabricating a thermochromic window according to an exemplary embodiment of the present invention.

FIG. 2 is a conceptual cross-sectional view showing a thermochromic window according to an exemplary embodiment of the present invention, and FIG. 3 is a conceptual flowchart showing a method of fabricating a thermochromic window according to an exemplary embodiment of the present invention.

Referring to FIG. 2 and FIG. 3, a thermochromic window according to an exemplary embodiment of the present invention includes a substrate 100, nanodots 200 and a thermochromic thin film 300.

The substrate 100 is the base substrate that is transparent or colored and has a preset area and thickness.

When the thermochromic window according to this exemplary embodiment is used for architectural or automotive glass, the substrate 100 can be made of soda-lime glass, and preferably, tempered or chemically-toughened glass.

The nanodots 200 are formed on the substrate 100.

The nanodots 200 can be made of one selected from among, but not limited to, Au, Ag, Pd and Pt.

The diameter of each of the nanodots 200 can be 10 nm or less, and the height of the nanodots 200 is preferably 9 nm or less. This is because the visible light transmittance of the thermochromic window decreases with the increasing height of the nanodots 200, i.e. the increasing thickness of the layer of the nanodots 200.

The nanodots 200 can be formed by a step S100 of coating the substrate 100 with a catalytic material, such as Au, Ag, Pd or Pt such that the catalytic material forms a catalytic coating layer on the substrate 100 and a subsequent step S200 of heat-treating the catalytic coating layer. When the catalytic coating layer is heat-treated, a change in the surface energy of the catalytic material and agglomeration, i.e. an intrinsic property of the material, cause dewetting that can transform the catalytic coating layer into nanodots. In general, the catalytic coating layer is transformed into the nanodots when heat-treated at about 250° C. for 10 minutes.

Figure 4:
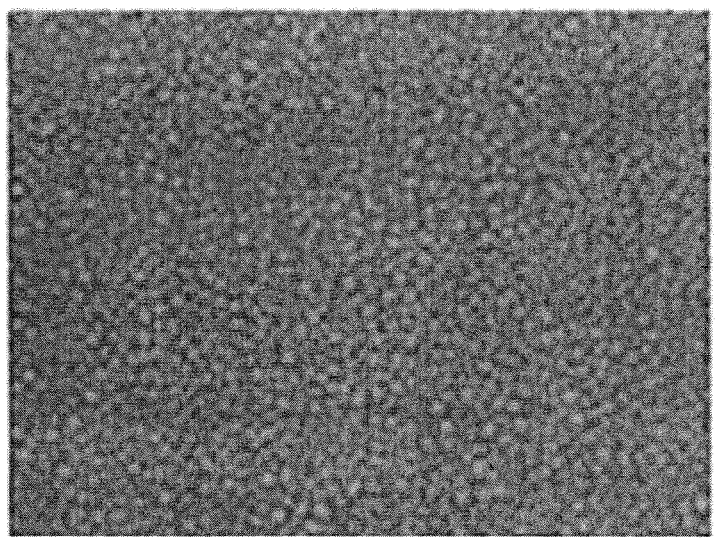
FIG. 4 is a scanning electron microscopy (SEM) picture of Ag catalyst which is transformed into nanodots by heat treatment.

FIG. 4 is a scanning electron microscopy (SEM) picture of Ag catalyst which is transformed into nanodots by heat treatment.

The step S100 of coating the substrate 100 with the catalytic material can be carried out by a variety of processes, such as physical vapor deposition (PVD) or chemical vapor deposition (CVD).

It is preferred that the step S100 of coating the substrate 100 with the catalytic material apply the catalytic material at a thickness of 5 nm or less since the nanodots can be formed better when the catalytic coating layer is thinner and the visible light transmittance of the thermochromic window can be increased when the height of the nanodots is lower, i.e. the nanodot layer is thinner. The height of the nanodots is increased to be greater than the thickness of the catalytic coating layer during the dewetting. It is experimentally appreciable that the height of the nanodots is increased to be greater than the thickness of the catalytic coating layer by about 70%.

The thermochromic thin film 300 is made of a thermochromic material, and is deposited on the substrate 100 and the nanodots 200.

The thermochromic material refers to the material that undergoes a change in the crystalline structure due to the thermochromic phenomenon in which its phase transits at a specific temperature (i.e. its phase transition temperature), whereby its physical properties, such as electrical conductivity and infrared (IR) transmittance, significantly change. The sunlight transmittance or reflectance, in particular, the near infrared (NIR) transmittance or reflectance of the thermochromic material significantly differs before and after the phase transition. Accordingly, the thermochromic thin film 200 can block IR radiation from the hot summer sun to prevent heat energy from entering, thereby reducing the cooling load, and can allow IR radiation from the cold winter sun to pass through, thereby reducing the heating load.

The composition of the thermochromic material may include one selected from among, but not limited to, vanadium dioxide ($VO_2$), titanium (III) oxide ($Ti_2O_3$), niobium dioxide ($NbO_2$) and nickel sulfide (NiS). It is preferred that the thermochromic material be $VO_2$, phase transition temperature of which is close to the temperature at which practical application is possible.

The thermochromic thin film 300 can be formed by a variety of processes, such as physical vapor deposition (PVD) or chemical vapor deposition (CVD).

When the substrate 100 having the nanodots 200 is coated with the thermochromic material, the thermochromic thin film 300 having a thickness variation is formed. The thickness of a thermochromic thin film area 300a formed on the substrate 100 is smaller than the thickness of a thermochromic thin film area 300b formed on the nanodots 200. In general, the catalytic material such as Ag or Au tends to promote formation of an oxide thin film or a metal thin film even if the catalytic material has a low energy state. Consequently, the thermochromic material is deposited at a faster rate on the nanodots 200, thereby forming a thicker thermochromic thin film area. In contrast, the thermochromic material is deposited at a lower rate on the portion of the substrate 100 between the nanodots 200, thereby forming a thinner thermochromic thin film area. Accordingly, it is possible to produce a textured thermochromic thin film by controlling the growth rate of the thermochromic thin film.

The step S200 of heat-treating the catalytic material can be carried out concurrently with a step S300 of forming a thermochromic thin film.

Since the process of forming the thermochromic thin film is generally carried out at a high temperature of 450° C. or higher, it is possible to transform the catalytic coating layer into nanodots during the process of forming the thermochromic thin film on the substrate having the catalytic coating layer thereon without carrying out separate heat treatment to transform the catalytic coating layer into nanodots. The catalytic coating layer can be transformed into the nanodots during the temperature-increasing process in which the thermochromic thin film is formed.

In addition, the thermochromic thin film 300 according to this exemplary embodiment can be made of a thermochromic material doped with a dopant.

It is possible to control the phase transition temperature of the thermochromic material by doping the thermochromic material with the dopant. The phase transition temperature of the thermochromic thin film lowers with the increasing doping ratio of the dopant.

The dopant can be one selected from among, but not limited to, Mo, W, Nb, Ta, Fe, Al, Ti, Sn and Ni.

Since the thermochromic window according to this exemplary embodiment is formed as above, the visible light transmittance of the thermochromic window can be increased. Specifically, the small thickness (preferably, 9 nm or less) of the nanodots 200 has no influence on the visible light transmittance of the thermochromic window, and the thermochromic thin film area 300a formed on the substrate 100 is thinner than the thermochromic thin film area 300b formed on the nanodots 200. These features can increase the visible light transmittance of the thermochromic window.

Figure 5:
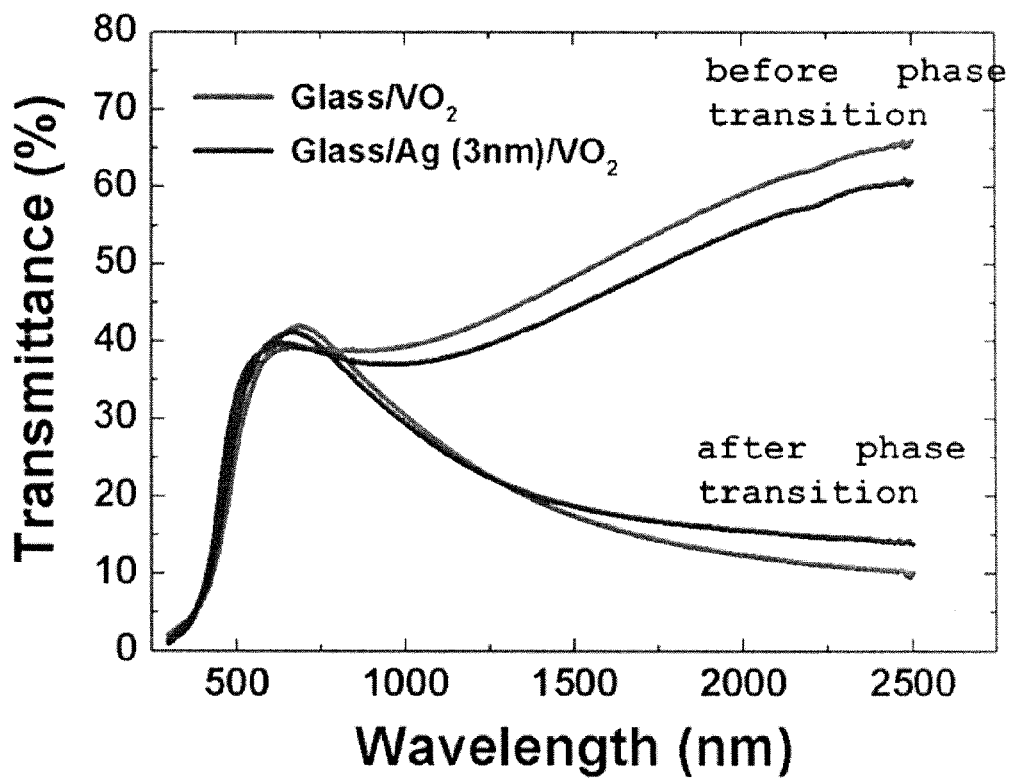
FIG. 5 is a graph showing variations in the sunlight transmittance of a conventional thermochromic window and a thermochromic window according to an example of the present invention before and after phase transition.

FIG. 5 is a graph showing variations in the sunlight transmittance of a conventional thermochromic window and a thermochromic window according to an example of the present invention before and after phase transition. The conventional thermochromic window has a glass substrate coated with vanadium dioxide ($VO_2$), whereas the thermochromic window according to the inventive example has a glass substrate, 3 nm-thick Ag nanodots disposed on the glass substrate and a $VO_2$ thin film coating the glass substrate and the nanodots. Table 1 represents the average transmittances of the thermochromic windows at a wavelength ranging from 380 to 780 nm before and after phase transition.

As shown in FIG. 5 and presented in Table 1, it can be appreciated that the average transmittance of the thermochromic window according to the inventive example was increased by about 1.6% from the average transmittance of the conventional thermochromic window in the visible light range.

TABLE 1

|  | Glass/$VO_2$ | | Glass/Ag(3 nm)/$VO_2$ | |
| --- | --- | --- | --- | --- |
|  | Before phase transition | After phase transition | Before phase transition | After phase transition |
| Average transmittance | 35.52 | 33.99 | 37.10 | 36.17 |

Figure 6:
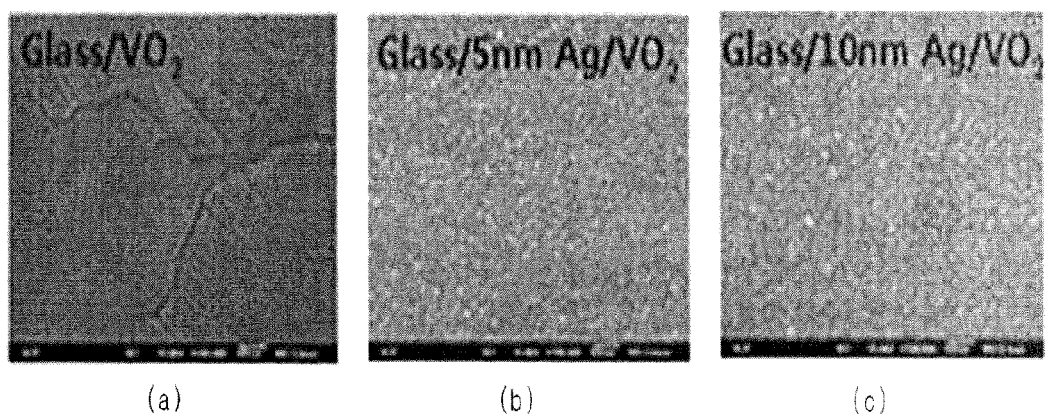
FIG. 6 is SEM pictures taken from a conventional thermochromic window and thermochromic windows according to examples of the present invention, in which particle sizes are recognizable.
Figure 7:
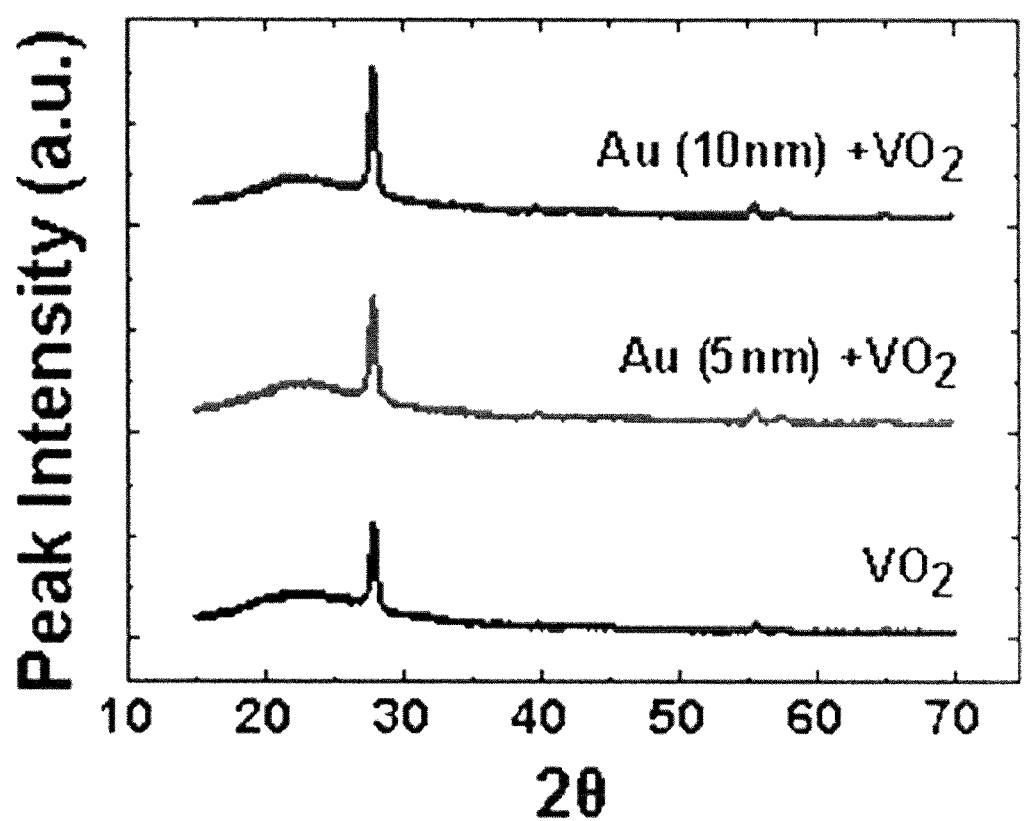
FIG. 7 is a graph showing X-ray diffraction (XRD) peaks of a conventional thermochromic window and thermochromic windows according to examples of the present invention.

According to the present invention, it is also possible to increase the particle size and crystallinity of the thermochromic thin film. FIG. 6 is SEM pictures taken from a conventional thermochromic window and thermochromic windows according to examples of the present invention, in which particle sizes are recognizable. In FIG. 6, part (a) of FIG. 6 is the SEM picture of the thermochromic window that has a glass substrate coated with vanadium dioxide ($VO_2$), part (b) of FIG. 6 is the SEM picture of the thermochromic window that has a glass substrate, 5 nm-thick Ag nanodots disposed on the glass substrate and a $VO_2$ thin film coating the glass substrate and the nanodots, and part (c) of FIG. 6 is the SEM picture of the thermochromic window that has a glass substrate, 10 nm-thick Ag nanodots disposed on the glass substrate and a $VO_2$ thin film coating the glass substrate and the nanodots. In addition, FIG. 7 is a graph showing X-ray diffraction (XRD) peaks of a conventional thermochromic window and thermochromic windows according to examples of the present invention. The conventional thermochromic window has a glass substrate coated with vanadium dioxide ($VO_2$). The thermochromic windows according to one inventive example has a glass substrate, 5 nm-thick Ag nanodots disposed on the glass substrate and a $VO_2$ thin film coating the glass substrate and the nanodots, and the thermochromic window according to the other inventive example has a glass substrate, 10 nm-thick Ag nanodots disposed on the glass substrate and a $VO_2$ thin film coating the glass substrate and the nanodots. As shown in FIG. 6 and FIG. 7, it can be appreciated that the particle size and crystallinity of the $VO_2$ thin film formed on the nanodots are increased to be greater than the particle size and crystallinity of the $VO_2$ thin film formed on the glass substrate. It can also be appreciated that the particle size and crystallinity of the thermochromic thin film grown on the nanodots increase with the increasing height of the nanodots, i.e. the increasing thickness of the nanodot layer.

In this manner, the increased crystallinity and particle size of the thermochromic thin film 300 can increase the transformation efficiency of the thermochromic thin film (the difference in the transmittance before and after phase transition).

In addition, the nanodots 200 can serve as a diffusion barrier that prevents ions inside the substrate 100 from diffusing into the thermochromic thin film 300. The process of forming the thermochromic thin film 300 is generally carried out at high temperature. When the thermochromic thin film 300 is formed directly on the substrate 100, ions inside the substrate 100 diffuse into the thermochromic thin film 300, whereby the thermochromic thin film 300 may lose its thermochromic characteristics. In particular, when the substrate 100 is made of soda-lime glass, sodium (Na) ions inside the glass tend to diffuse into the thermochromic thin film 300 (sodium diffusion). According to the present invention, however, the nanodots 200 disposed between the substrate 100 and the thermochromic thin film 300 can reduce the diffusion of ions inside the substrate 100 into the thermochromic thin film 300, thereby preventing the thermochromic thin film 300 from losing its thermochromic characteristics.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A thermochromic window comprising:
    a substrate;
    a plurality of nanodots formed on the substrate; and
    a thermochromic thin film coating the substrate and the nanodots to form a valley portion on the substrate and a peak portion on the nanodots, the thermochromic thin film being made of a thermochromic material,
    wherein a thickness of the valley portion of the thermochromic thin film extending normal to the substrate is smaller than a thickness of the peak portion of the thermochromic thin film extending normal to the nanodots, and
    the plurality of nanodots increases visible light transmittance such that the thermochromic window has higher visible light transmittance than when the plurality of nanodots is removed from the thermochromic window.

2. The thermochromic window according to claim 1, wherein the nanodots are made of one selected from the group consisting of Au, Ag, Pd and Pt.

3. The thermochromic window according to claim 1, wherein a height of the nanodots is 9 nm or less.

4. The thermochromic window according to claim 1, wherein the thermochromic thin film further comprises a dopant.

5. The thermochromic window according to claim 4, wherein the dopant comprises at least one selected from the group consisting of Mo, W, Nb, Ta, Fe, Al, Ti, Sn and Ni.

6. The thermochromic window according to claim 1, wherein the thermochromic material is vanadium dioxide.

* * * * *